US011467715B2

(12) United States Patent
Wang

(10) Patent No.: US 11,467,715 B2
(45) Date of Patent: Oct. 11, 2022

(54) USER INTERFACE DISPLAY METHOD, TERMINAL AND NON-TRANSITORY COMPUTER-READABLE STORAGE MEDIUM FOR SPLITTING A DISPLAY USING A MULTI-FINGER SWIPE

(71) Applicant: GUANGDONG OPPO MOBILE TELECOMMUNICATIONS CORP., LTD., Guangdong (CN)

(72) Inventor: Xiao Wang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/374,920

(22) Filed: Jul. 13, 2021

(65) Prior Publication Data

US 2021/0342045 A1 Nov. 4, 2021

Related U.S. Application Data

(63) Continuation of application No. PCT/CN2020/071655, filed on Jan. 13, 2020.

(30) Foreign Application Priority Data

Jan. 15, 2019 (CN) .......................... 201910037060.3

(51) Int. Cl.
*G06F 3/0484* (2022.01)
*G06F 9/451* (2018.01)
(Continued)

(52) U.S. Cl.
CPC .......... *G06F 3/0484* (2013.01); *G06F 1/1641* (2013.01); *G06F 3/04883* (2013.01);
(Continued)

(58) Field of Classification Search
CPC .... G06F 3/0484; G06F 3/04883; G06F 9/451; G06F 1/1641; G06F 3/04886; G06F 2203/04803
See application file for complete search history.

(56) References Cited

U.S. PATENT DOCUMENTS

2011/0107272 A1* 5/2011 Aguilar ............... G06F 3/04883
715/853
2014/0075394 A1* 3/2014 Nawle ................... H04M 1/724
715/863
(Continued)

FOREIGN PATENT DOCUMENTS

CN 104834437 A 8/2015
CN 106484220 A 3/2017
(Continued)

OTHER PUBLICATIONS

International Search Report with English Translation for International Application PCT/CN2020/071655 dated Apr. 20, 2020. (12 pages).
(Continued)

*Primary Examiner* — Daniel Samwel
(74) *Attorney, Agent, or Firm* — Young Basile Hanlon & MacFarlane, P.C.

(57) ABSTRACT

Disclosed are a user interface display method, a terminal and a non-transitory computer-readable storage medium. The method is applied to a terminal. The terminal includes a foldable screen including a first display area and a second display area. The method includes: displaying a user interface of a first application in full screen while the foldable screen is in a stretched state; receiving a first multi-finger swipe signal acted on the user interface of the first application displayed in full screen; wherein the first multi-finger swipe signal is generated in response to detecting at least two fingers sliding on the foldable screen; and in response to (Continued)

receiving the first multi-finger swipe signal, displaying the user interface of the first application in the first display area and displaying a user interface of a second application in the second display area.

18 Claims, 8 Drawing Sheets

(51) Int. Cl.
    *G06F 3/04886*     (2022.01)
    *G06F 1/16*     (2006.01)
    *G06F 3/04883*     (2022.01)

(52) U.S. Cl.
    CPC .......... *G06F 3/04886* (2013.01); *G06F 9/451* (2018.02); *G06F 2203/04803* (2013.01)

(56) References Cited

U.S. PATENT DOCUMENTS

| | | | |
|---|---|---|---|
| 2016/0048320 A1* | 2/2016 | Han | G06F 3/04883 715/765 |
| 2017/0031555 A1 | 2/2017 | Ma | |
| 2017/0075559 A1 | 3/2017 | Jung et al. | |
| 2018/0039408 A1* | 2/2018 | Cheong | G06F 1/1677 |
| 2018/0225132 A1* | 8/2018 | Pierce | G06F 3/0482 |
| 2018/0356972 A1* | 12/2018 | Wang | G06F 3/044 |

FOREIGN PATENT DOCUMENTS

| | | |
|---|---|---|
| CN | 106775313 A | 5/2017 |
| CN | 107526492 A | 12/2017 |
| CN | 107704177 A | 2/2018 |
| CN | 107844228 A | 3/2018 |
| CN | 108632462 A | 10/2018 |
| CN | 109766053 A | 5/2019 |
| EP | 2674834 A2 | 12/2013 |
| EP | 3557398 A1 | 10/2019 |

OTHER PUBLICATIONS

Chinese First Office Action with English Translation for CN Application 201910037060.3 dated Apr. 20, 2020. (15 pages).

European Extended Search Report for application No. 20741555.5 dated Feb. 9, 2022 (14 pages).

* cited by examiner

USER INTERFACE DISPLAY METHOD, TERMINAL AND NON-TRANSITORY COMPUTER-READABLE STORAGE MEDIUM FOR SPLITTING A DISPLAY USING A MULTI-FINGER SWIPE

CROSS-REFERENCE TO RELATED APPLICATION(S)

The present application is a continuation-application of International (PCT) Patent Application No. PCT/CN2020/071655, filed on Jan. 13, 2020, which claims priority of Chinese Patent Application No. 201910037060.3 filed on Jan. 15, 2019, the entire contents of both of which are hereby incorporated by reference.

TECHNICAL FIELD

The present disclosure relates to the field of human-computer interaction technologies, and in particular to a user interface display method, a terminal, and a non-transitory computer-readable storage medium.

BACKGROUND

There are multiple applications installed on a smartphone, and when the multiple applications are running in the background, a user can switch one of the applications to run in the foreground.

In related technologies, the terminal displays a user interface of the application running in the foreground. When the user needs to view the user interface of another application, the application running in the foreground is required to be closed and the application corresponding to the user interface to be viewed is required to be switched to the foreground.

SUMMARY

The present disclosure provides a user interface display method, a terminal, and a computer-readable storage medium.

In an aspect, embodiments of the present disclosure provides a user interface display method for to a terminal; wherein the terminal includes a foldable screen including a first display area and a second display area; the method includes: displaying a user interface of a first application in full screen while the foldable screen is in a stretched state; wherein the stretched state is a state where the first display area and the second display area are on a same plane; receiving a first multi-finger swipe signal acted on the user interface of the first application displayed in full screen; wherein the first multi-finger swipe signal is generated in response to detecting at least two fingers sliding on the foldable screen; and in response to receiving the first multi-finger swipe signal, displaying the user interface of the first application in the first display area and displaying a user interface of a second application in the second display area.

In another aspect, embodiments of the present disclosure provide a terminal, including a processor and a storage storing a computer program; wherein the computer program is loaded and executed by the processor to implement the user interface display method.

In further another aspect, embodiments of the present disclosure provide non-transitory a computer-readable storage medium storing a computer program; wherein the computer program is loaded and executed by a processor to implement the user interface display method.

DETAILED DESCRIPTION

To make the objectives, technical solutions, and advantages of the present disclosure clearer, the following will further describe the embodiments of the present disclosure in detail with reference to the accompanying drawings.

Figure 1:
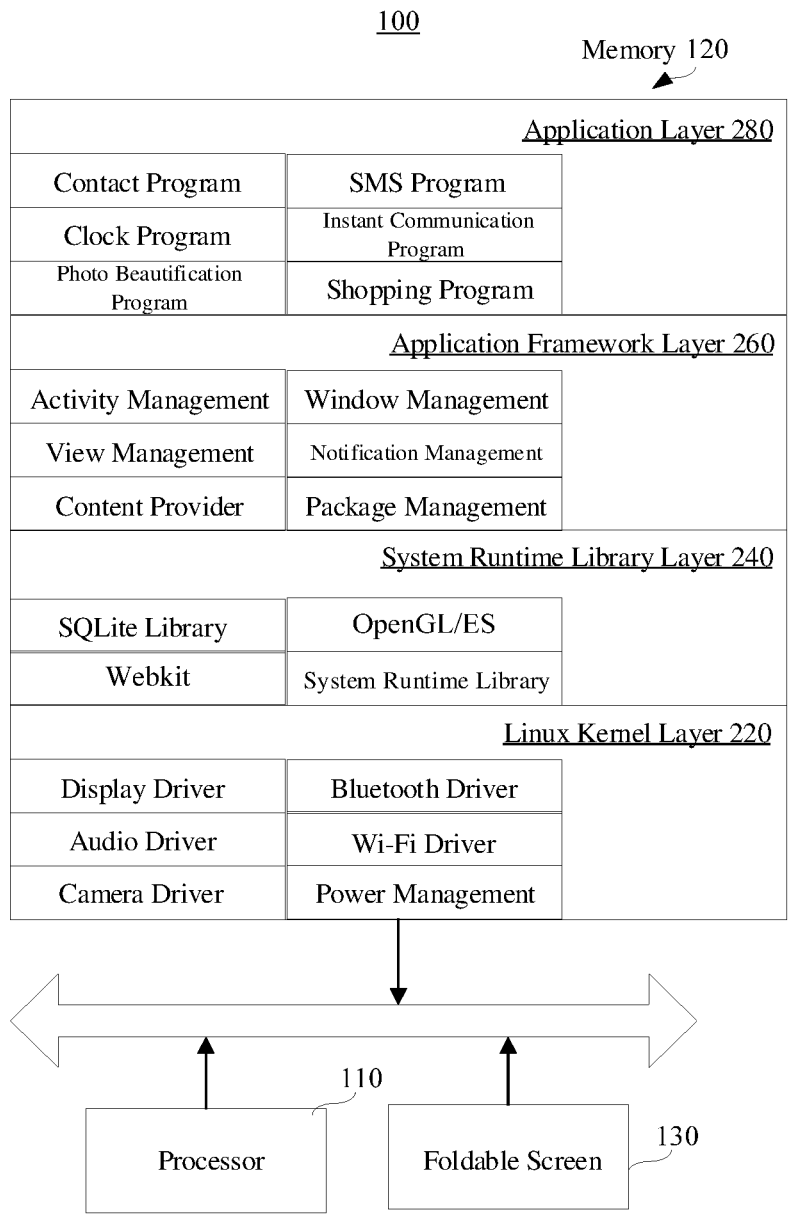
FIG. 1 is a block view of a terminal according to an embodiment of the present disclosure.
Figure 2:
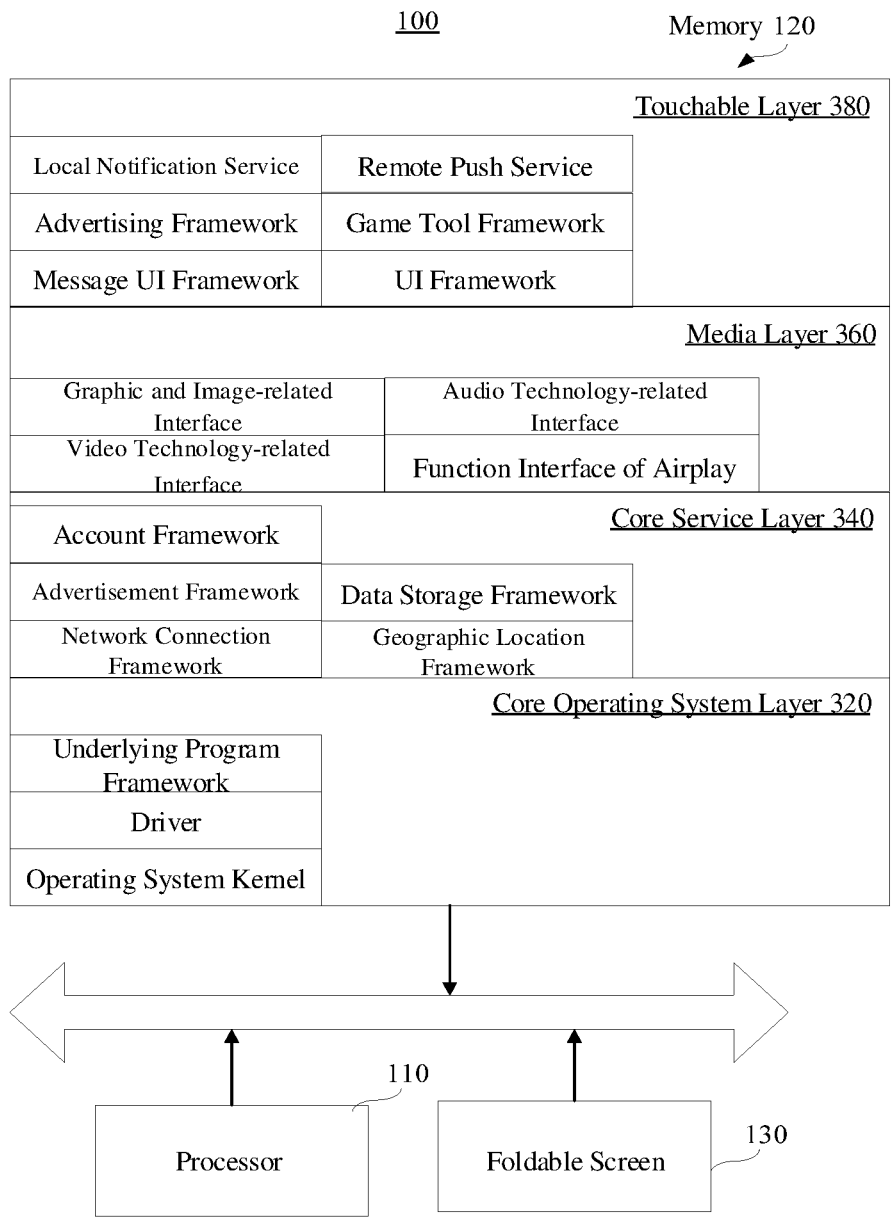
FIG. 2 is a block view of a terminal according to another embodiment of the present disclosure.

Referring to FIG. 1 and FIG. 2, which are block views of a terminal according to embodiments of the present disclosure. The terminal 100 may be a smart phone, a tablet computer, an e-book, and so on. The terminal 100 in the present disclosure may include one or more of the following components: a processor 110, a memory 120, and a foldable display 130.

The processor 110 may include one or more processing cores. The processor 110 includes various interfaces and lines to connect various parts of the terminal 100, and executes various functions and processing data of the terminal 100 by running or executing instructions, programs, code sets, or instruction sets stored in the memory 120 and calling data stored in the memory 120. In some embodiments, the processor 110 may be realized by at least one kind of hardware form as: digital signal processing (DSP), field-programmable gate array (FPGA), and programmable logic array (PLA). The processor 110 may integrate one or a combination of a central processing unit (CPU), a graphics processing unit (GPU), a modem, and the like. The CPU is mainly configured to process an operating system, a user interface, and applications. The GPU is configured to render and draw content required to be displayed on the touchable screen 130. The modem is configured to process wireless communication. It can be understood that the modem may not be integrated into the processor 110, but may be implemented by a chip alone.

The memory 120 may include random access memory (RAM), or read-only memory (ROM). In some embodiments, the memory 120 includes a non-transitory computer-readable storage medium. The memory 120 may be configured to store instructions, programs, codes, code sets or instruction sets. The memory 120 may include a program storage area and a data storage area, where the program storage area may store instructions for implementing the operating system, instructions for at least one function (such as touch function, sound playback function, image playback function, etc.), instructions for implementing the following various method embodiments, etc. The storage data area can store data (such as audio data, phone book) created according to the use of the terminal 100 and the like.

Taking Android system as the operating system as an example, the programs and data stored in the memory 120 are as shown in FIG. 1. The memory 120 stores a Linux kernel layer 220, a system runtime library layer 240, an application framework layer 260, and an application layer 280. The Linux kernel layer 220 provides low-level drivers for various hardware of the terminal 100, such as display drivers, audio drivers, camera drivers, Bluetooth drivers, Wi-Fi drivers, power management, etc. The system runtime library layer 240 provides major feature support for the Android system through some C/C++ libraries. For example, SQLite library provides database support, OpenGL/ES library provides 3D drawing support, and Webkit library provides browser kernel support. The system runtime library layer 240 also provides an Android runtime library, which mainly provides some core libraries allowing developers to use Java language to write Android applications. The application framework layer 260 provides various application interfaces (APIs) that may be used when building applications. Developers can also use these APIs to build their own applications, such as activity management, window management, view management, notification management, content providers, package management, call management, resource management, and location management. There is at least one application running in the application layer 280. These applications may be contact programs, short message programs, clock programs, camera applications, etc., which are included in the operating system. These applications may also be applications developed by third-party developers, such as instant communication program, photo beautification program, etc.

Taking IOS system as the operating system as an example, the programs and data stored in the memory 120 are shown in FIG. 2. The IOS system includes: a core operating system (OS) layer 320, a core service layer 340, a media layer 360, and a touchable layer 380 (Cocoa Touch Layer). The core OS layer 320 includes an operating system kernel, drivers, and underlying program frameworks. The underlying program frameworks provide functions closer to hardware for use by the program frameworks located in the core service layer 340. The core service layer 340 provides system services and/or program frameworks required by applications, such as a foundation framework, an account framework, an advertisement framework, a data storage framework, a network connection framework, a geographic location framework, a sports framework, etc. The media layer 360 provides audio-visual interfaces for applications, such as graphics and image-related interfaces, audio technology-related interfaces, video technology-related interfaces, and audio and video transmission technology wireless playback (AirPlay) interfaces. The touchable layer 380 provides various commonly used interface-related frameworks for application development, and the touchable layer 380 is for a touch interaction operation of the user on the terminal 100. For example, local notification service, remote push service, advertising framework, game tool framework, message user interface (UI) framework, user interface UIKit framework, map framework, etc.

In the framework shown in FIG. 2, the frameworks related to most applications include but are not limited to: a basic framework in the core service layer 340 and a UIKit framework in the touchable layer 380. The basic framework provides many basic object classes and data types, providing the most basic system services for all applications, which has nothing to do with UI. The classes provided by the UIKit framework are basic UI class libraries to create touch-based user interfaces. IOS applications can provide UI based on the UIKit framework. The UIKit framework provides the basic architecture of the application for building user interfaces, drawing, processing, user interaction events, responding to gestures, etc.

The foldable display screen 130 is a screen with a folding function for displaying the user interface of various applications. In cases that the foldable display screen 130 also has a touch function, the foldable display screen 130 is also configured to receive touch operations on or near it by the user using any suitable object such as a finger, a stylus, etc.

Figure 3:
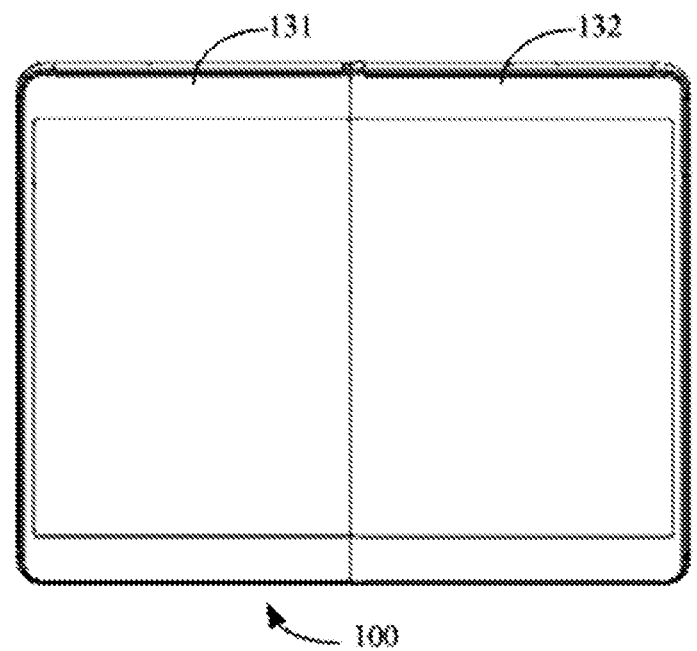
FIG. 3 is a schematic view of a foldable display screen according to an embodiment of the present disclosure.

In some embodiments, the foldable display screen 130 includes a first display area 131 and a second display area 132. In a stretched state, as shown in FIG. 3, the first display area 131 and the second display area 132 are on a same plane. In a folded state, as shown in FIG. 4, the first display area 131 and the second display area 132 are on different planes.

It should be noted that the first display area 131 and the second display area 132 are only configured to distinguish different display areas on the foldable display screen 130. The first display area 131 and the second display area 132 belong to the same foldable display screen 130 in essence.

To realize the folding of the display screen, in some embodiments, the foldable display screen 130 is made of a flexible material (with a certain degree of stretchability). Alternatively, a connection area between the first display area 131 and the second display area 132 is made of a flexible material.

Figure 4:
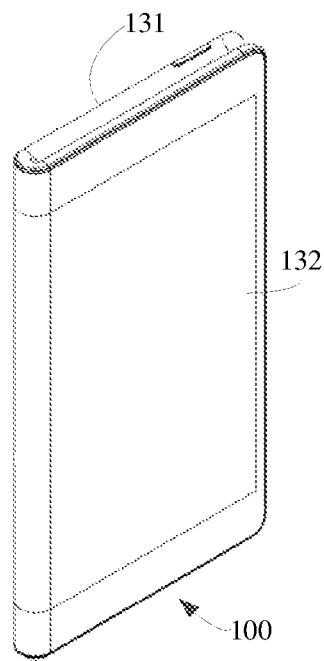
FIG. 4 is a schematic view of a foldable display screen in another state according to an embodiment of the present disclosure.

FIGS. 3 and 4 both take the terminal 100 as an outer-foldable-screen terminal as an example (that is, the terminal with the foldable display exposed in the folded state). In other embodiments, the terminal 100 may also be an inner-foldable-screen terminal (that is, the terminal with the foldable display screen not exposed in the folded state). For ease of presentation, the following embodiments take the terminal 100 as the outer-foldable-screen terminal as an example for description, but this does not constitute a limitation.

As shown in FIGS. 3 and 4, the foldable display screen 130 includes two display areas as an example for description. In other embodiments, the foldable display screen 130 may include n (n≥3) display areas to achieve a structure with n−1 folding of the terminal.

In some embodiments, the terminal 100 is further arranged with at least one other component. The at least one other component may include: a camera, a fingerprint sensor, a proximity light sensor, a distance sensor, etc. In some embodiments, the at least one other component is arranged on a front, side or back surface of the terminal 100. For example, the fingerprint sensor may be arranged on a back cover or the side surface, and the camera may be arranged on a side with the foldable display 130.

In other embodiments, the at least one other component may be integrated in an inner or lower layer of the foldable display screen 130. In some embodiments, a bone conduction earpiece is arranged inside the terminal 100. Other components on a front panel of a traditional terminal may be integrated into all or part of the foldable display screen 130. For example, after splitting a light-sensitive element in the camera into a plurality of light-sensitive pixels, each light-sensitive pixel is integrated in a black area in each display pixel in the foldable display 130, enabling the folding display 130 to have an image capture function. The terminal 100 has a higher screen-to-body ratio due to the integration of the at least one other component inside or under the foldable display 130.

In some embodiments, an edge touch sensor is arranged on a single side, or two sides (e.g., left and right sides), or four sides (e.g., top, bottom, left, and right sides) of a middle frame of the terminal 100. The edge touch sensor is configured to detect at least one of touch operation, click operation, press operation, and slide operation, etc. of the user on the middle frame. The edge touch sensor may be any one of a touch sensor, a thermal sensor, a pressure sensor, etc. The user can apply an operation on the edge touch sensor to control applications in the terminal 100.

In addition, those skilled in the art can understand that the structure of the terminal 100 shown in the above drawings does not constitute a limitation on the terminal 100. The terminal may include more or less components than those shown in the figures, or a combination of certain components, or different component arrangements. For example, the terminal 100 may also include components such as a radio frequency circuit, an input unit, an audio circuit, a wireless fidelity (Wi-Fi) module, a power supply, a Bluetooth module, etc., which are not repeated here.

In the embodiments of the present disclosure, a user interface display method is provided. When the user interface of a certain application is displayed on the foldable screen in full screen, the foldable screen may be displayed in split screen in response to receiving a multi-finger swipe signal acted on the user interface, enabling the user to view the user interface of other applications without closing the above certain application, thereby improving the usage efficiency of the terminal.

The technical solutions provided in embodiments of the present disclosure may be applied to the terminal 100. The terminal 100 includes a foldable screen (that is, the foldable display screen 130 mentioned in the above embodiments) which has a first display area and a second display area.

The foldable screen 130 is capable of switching between a stretched state and a folded state. The stretched state refers to a state where the first display area and the second display area are on a same plane. That is, an angle between the first display area and the second display area is 180 degrees. The folded state refers to a state where the first display area and the second display area are not on a same plane. When the foldable screen 130 is in the folded state, the angle between the first display area and the second display area may be 0 degrees to 180 degrees, or 180 degrees to 360 degrees (not including 180 degrees). The user can switch the foldable screen 130 between the stretched state and the folded state based on requirements. For example, when the user does not have a need to use the terminal, the terminal may be placed in the folded state, making the terminal more portable. For another example, when the user needs to watch a video, the terminal may be in the stretched state.

Figure 5:
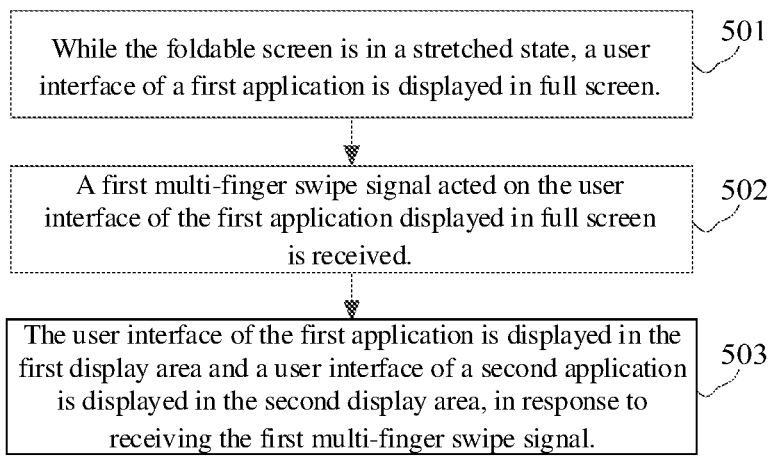
FIG. 5 is a flowchart of a user interface display method according to an embodiment of the present disclosure.

Referring to FIG. 5, which is a flowchart of a user interface display method according to an embodiment of the present disclosure. The method may be applied to a terminal. The terminal includes a foldable screen. The foldable screen includes a first display area and a second display area. The method includes operations at blocks illustrated in FIG. 5.

At block 501: While the foldable screen is in a stretched state, a user interface of a first application is displayed in full screen.

The stretched state refers to a state where the first display area and the second display area are on a same plane. That is, an angle between the first display area and the second display area is 180 degrees. The terminal can detect whether the foldable screen is in the stretched state by detecting the angle between the first display area and the second display area. When the angle between the first display area and the second display area is detected to be 180 degrees, the screen is in the stretched state. When the angle between the first display area and the second display area is detected not to be 180 degrees, the foldable screen is in a folded state. When the foldable screen is in the folded state, the terminal does not perform subsequent operations. The first application may be any application installed on the terminal, and may be a native application or a third-party application, which is not limited in the embodiments of the present disclosure. In some embodiments, the terminal displays a desktop interface on the foldable screen in full screen, the user selects the first application in the desktop interface, and the terminal displays the user interface of the first application on the foldable screen in full screen based on a selection signal corresponding to the first application.

At block 502: A first multi-finger swipe signal acted on the user interface of the first application displayed in full screen is received.

The first multi-finger swipe signal refers to a signal generated in response to detecting at least two fingers slide on the foldable screen. The multi-finger swipe signal usually includes multiple sliding tracks. Specifically, the number of fingers touching the foldable screen is also the number of the sliding tracks. In the embodiments of the present disclosure, the terminal may determine whether a received operation signal is the first multi-finger swipe signal based on the number of the sliding tracks. In the embodiments of the present disclosure, the first multi-finger swipe signal being a three-finger swipe signal is taken as an example for description.

At block 503: The user interface of the first application is displayed in the first display area and a user interface of a second application is displayed in the second display area, in response to receiving the first multi-finger swipe signal.

The size of the user interface of the first application displayed in the first display area matches the size of the first display area. Specifically, the size of the user interface of the first application is smaller than or equal to the size of the first display area, and the difference between the two is smaller than a preset threshold. The preset threshold may be configured based on actual experience, which is not limited in the embodiments of the present disclosure.

The user interface of the first application that matches the first display area may be obtained in the following manner. In some embodiments, the terminal is configured to perform shrinking processing on the user interface of the first application displayed in full screen; and obtain the user interface of the first application after the shrinking processing. The user interface of the first application after the shrinking processing matches the first display area. In other embodiments, the terminal is configured to pre-store the user interface of the first application that matches the first display area; and when receiving the multi-finger swipe signal, obtain the user interface of the first application that matches the first display area and display the user interface of the first application that matches the first display area in the first display area.

The second application refers to any application that has been installed in the terminal except the first application. It may be a native application or a third-party application, which is not limited in the embodiments of the present disclosure. In some embodiments, when receiving the multi-finger swipe signal, the terminal is configured to render the user interface of the second application based on the size of the second display area, and display the user interface of the second application in the second display area.

In some embodiments, the operation 503 may be specifically implemented as followed.

At block 503a: An application display interface in the second display area is displayed.

The application display interface is configured to display at least one application including the second application. The application display interface can display an application icon or an application name. In some embodiments, the application display interface is a desktop interface.

In some embodiments, the number of applications displayed on the application display interface is determined according to the size of the second display area. In some embodiments, the embodiments of the present disclosure do not limit the number of the applications displayed on the application display interface. When the number of the applications to be displayed on the application display interface is greater than the number of applications that can be accommodated in the second display area, the terminal may be configured to display part of the applications to be displayed on the application display interface in the second display area, and the user can perform a sliding operation on the second display area, and then the terminal displays the remaining applications in the second display area.

In some embodiments, the application display interface is configured to display an application matching the first application. The application matching the first application may be an application with the same type of the first application, or may be an application of which the frequency of running simultaneously with the first application meets a first preset condition.

In some embodiments, the terminal may be configured to store a correspondence between applications and types. When receiving the multi-finger swipe signal, the terminal may be configured to firstly search the correspondence to determine the type of the first application, and then determines an application with the same type of the first application.

The frequency of running simultaneously with the first application refers to the frequency or number of times of running simultaneously with the first application. The first preset condition may be that the frequency of running simultaneously with the first application is greater than a first threshold, or the frequency of running simultaneously with the first application is ranked in top n places. The values of the first threshold and n may be configured based on actual requirements, which are not limited in the embodiments of the present disclosure. In some embodiments, the terminal is configured to count applications running simultaneously with the first application when the first application is running, count the frequency of each application running simultaneously with the first application every preset time, and filter out the application of which the frequency of running simultaneously with the first application meets the first preset condition.

When the application display interface is configured to display the application matching the first application, before the operation 503a, the user interface display method may further include: determining an application with the same type of the first application as the application matching the first application; and/or, determining an application that runs simultaneously with the first application and meets the first preset condition as the application matching the first application.

At block 503b: A second operation signal acted on the second application is received.

The second operation signal may be any one of a single click signal, a double click signal, a long press signal, a slide signal, and a drag signal. In the embodiments of the present disclosure, the second operation signal being a single click signal is taken as an example for description. When the user needs to run the second application, the user may click the second application.

At block 503c: The application display interface displayed in the second display area is switched to the user interface of the second application in response to receiving the second operation signal.

The terminal is configured to display the user interface of the second application in the second display area.

Figure 6:
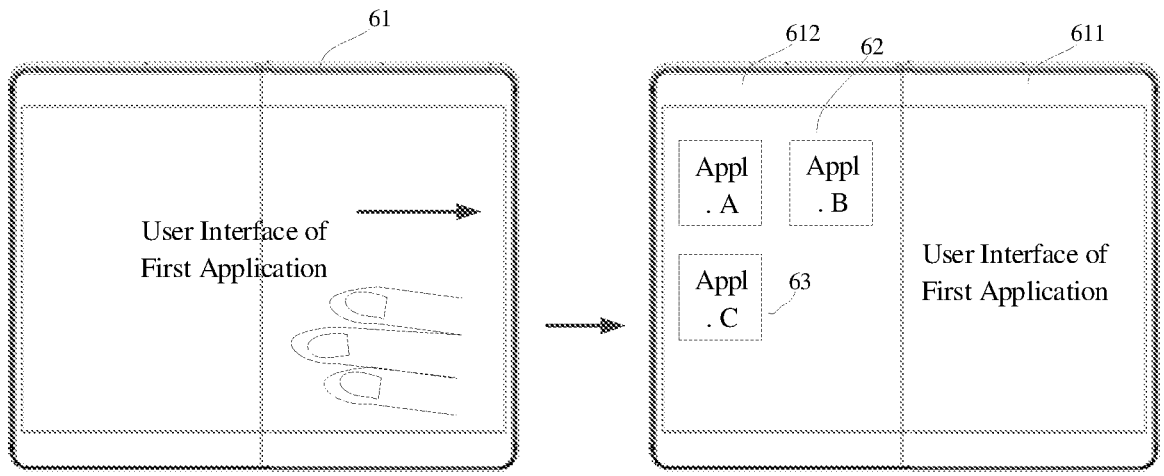
FIG. 6 is a schematic view of a user interface according to an embodiment of the present disclosure.
Figure 6:
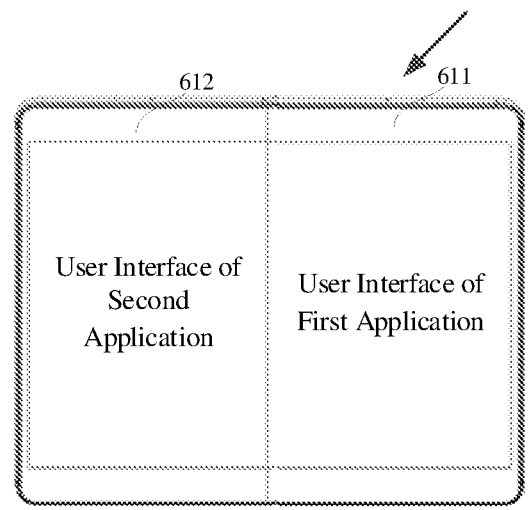

Referring to FIG. 6, FIG. 6 is a schematic view of a user interface according to an embodiment of the present disclosure. The terminal is configured to display the user interface of the first application on the foldable screen 61. When the terminal receives a three-finger swipe signal, the terminal may be configured to display the user interface of the first application in the first display area 611, and display the desktop interface 62 in the second display area 612. When the terminal receives a click signal acted on the second application 63, the terminal is configured to display the user interface of the second application in the second display area 612.

In summary, in the technical solutions provided by the embodiments of the present disclosure, when the foldable screen displays a user interface of the application running in the foreground in full screen, the terminal may be configured to receive a multi-finger swipe signal, and display the user interface of the application running in the foreground in the first display area of the foldable screen and the user interface of another application in the second display area in response to receiving the multi-finger swipe signal, thereby enabling the user to view the user interface of other applications without closing the application running in the foreground. The user interface of the other applications may be viewed without closing the application running in the foreground, which improves the efficiency of using the terminal.

When the user makes the foldable screen enter a split-screen state through the multi-finger swipe signal (that is, the screen displays the user interface of two applications at the same time), the foldable screen may also exit the split-screen state through the multi-finger swipe signal. In some embodiments provided based on the embodiments shown in FIG. 5, the user interface display method may further include operations at blocks as followed.

At block 701: A second multi-finger swipe signal acted on the foldable screen is received.

The second multi-finger swipe signal refers to a signal generated in response to detecting at least two fingers slide on the foldable screen.

At block 702: A target user interface is displayed on the foldable screen in full screen in response to receiving the second multi-finger swipe signal.

The target user interface may be the user interface of the first application or the user interface of the second application.

In some embodiments, the terminal is configured to determine the target user interface based on an initial touch position of the multi-finger swipe signal. The operation 702 may be specifically implemented as followed.

At block 702a: An initial touch position of the second multi-finger swipe signal is obtained.

The initial touch position of the multi-finger swipe signal refers to a position at which the user's finger touches the foldable screen when the terminal starts to receive the multi-finger swipe signal. The initial touch position may be represented by coordinates.

At block 702b: The target user interface is determined based on an area at which the initial touch position is located.

In some embodiments, the terminal is configured to determine the target user interface based on the area where the initial touch position is located. The terminal is configured to store a set of coordinates corresponding to the first display area and a set of coordinates corresponding to the second display area. When the coordinates of the initial touch position belong to the set of coordinates corresponding to the first display area, the area where the initial touch position is located is the first display area. When the coordinates of the initial touch position belong to the set of coordinates corresponding to the second display area, the area where the initial touch position is located is the second display area.

In some embodiments, when the initial touch position of the multi-finger swipe signal is in the first display area, the user interface of the first application is displayed on the foldable screen in full screen. When the initial touch position of the multi-finger swipe signal is in the second display area, the user interface of the second application is displayed on the foldable screen in full screen. In other embodiments, when the initial touch position of the multi-finger swipe signal is in the first display area, the user interface of the second application is displayed on the foldable screen in full screen. When the initial touch position of the multi-finger swipe signal is in the second display area, the user interface of the first application is displayed on the foldable screen in full screen.

In some embodiments, the terminal is configured to determine the target user interface based on a sliding direction of the multi-finger swipe signal. The operation 702 may be specifically implemented as followed.

At block 702c: A sliding direction of the second multi-finger swipe signal is obtained.

The sliding direction of the multi-finger swipe signal may be a direction from the first display area to the second display area, or a direction from the second display area to the first display area. The terminal may determine the sliding direction of the multi-finger swipe signal based on a relative position relationship between a start touch position and an end touch position of the first multi-finger swipe signal.

At block 702d: A user interface corresponding to the sliding direction is determined as the target user interface.

In some embodiments, when the sliding direction of the multi-finger swipe signal is the direction from the first display area to the second display area, the user interface of the first application is displayed on the foldable screen in full screen. When the sliding direction of the multi-finger swipe signal is the direction from the second display area to the first display area, the user interface of the second application is displayed on the foldable screen in full screen. In other embodiments, when the sliding direction of the multi-finger swipe signal is the direction from the first display area to the second display area, the user interface of the second application is displayed on the foldable screen in full screen. When the sliding direction of the multi-finger swipe signal is the direction from the second display area to the first display area, the user interface of the first application is displayed on the foldable screen in full screen.

Figure 7:
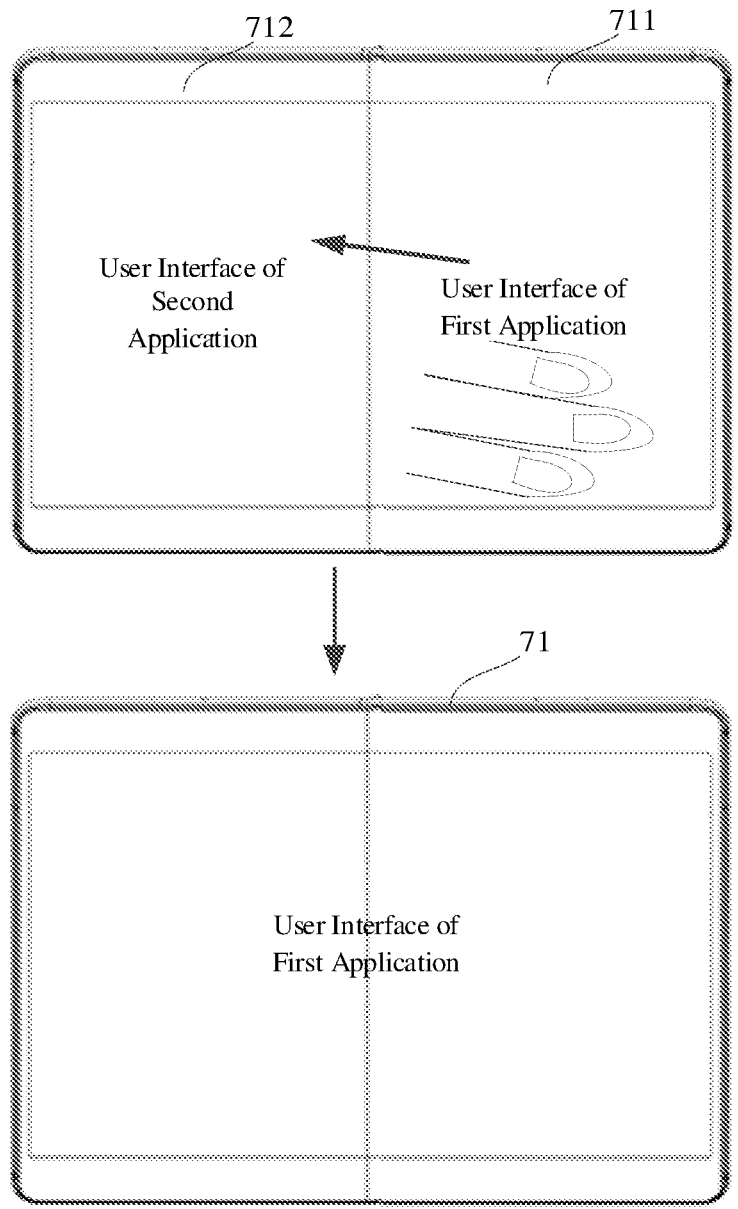
FIG. 7 is a schematic view of a user interface according to another embodiment of the present disclosure.

Referring to FIG. 7, FIG. 7 is a schematic view of a user interface according to another embodiment of the present disclosure. The terminal is configured to display the user interface of the first application in the first display area 711 and display the user interface of the second application in the second display area 712. When the terminal receives a three-finger swipe signal of which the initial touch position is in the first display area 711, the terminal is configured to display the user interface of the first application on the foldable screen 71 in full screen.

Figure 8:
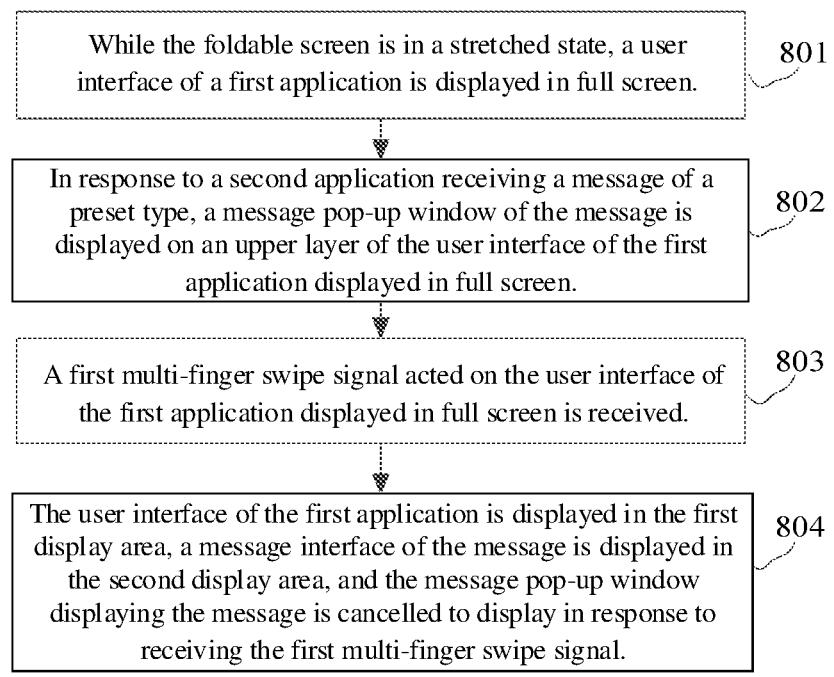
FIG. 8 is a flowchart of a user interface display method according to another embodiment of the present disclosure.

Referring to FIG. 8, FIG. 8 is a flowchart of a user interface display method according to another embodiment of the present disclosure. The method may be applied to a terminal. The terminal has a foldable screen. The foldable screen includes a first display area and a second display area. The method includes operations at blocks as followed.

At block 801: While the foldable screen is in a stretched state, a user interface of a first application is displayed in full screen.

The stretched state refers to a state where the first display area and the second display area are on the same plane.

At block 802: In response to a second application receiving a message of a preset type, a message pop-up window of the message is displayed on an upper layer of the user interface of the first application displayed in full screen.

In the embodiments of the present disclosure, the second application is an application with a conversation function, such as an instant messaging application. In some embodiments, the message of the preset type refers to a conversation message, which may be a chat message, a voice call message, or a video call message. In the embodiments of the present disclosure, the message of the preset type being a voice call message or a video call message is taken as an example for description.

When the second application receives a voice call message or a video call message, the message pop-up window displaying the voice call message or the video call message is superimposed on the user interface of the first application. The message pop-up window may be a mini message pop-up window. A requester's nickname, avatar, and receiving button may be displayed on the message pop-up window.

At block 803: A first multi-finger swipe signal acted on the user interface of the first application displayed in full screen is received.

The first multi-finger swipe signal refers to a signal generated in response to detecting at least two fingers slide on the foldable screen.

At block 804: The user interface of the first application is displayed in the first display area, a message interface of the message is displayed in the second display area, and the message pop-up window displaying the message is cancelled to display in response to receiving the first multi-finger swipe signal.

In the embodiments of the present disclosure, the second application is an application corresponding to the message. When the terminal receives the first multi-finger swipe signal, the message pop-up window is cancelled and the message interface is displayed, which is also the user interface of the second application. The message interface is configured to display the specific content of the message.

Figure 9:
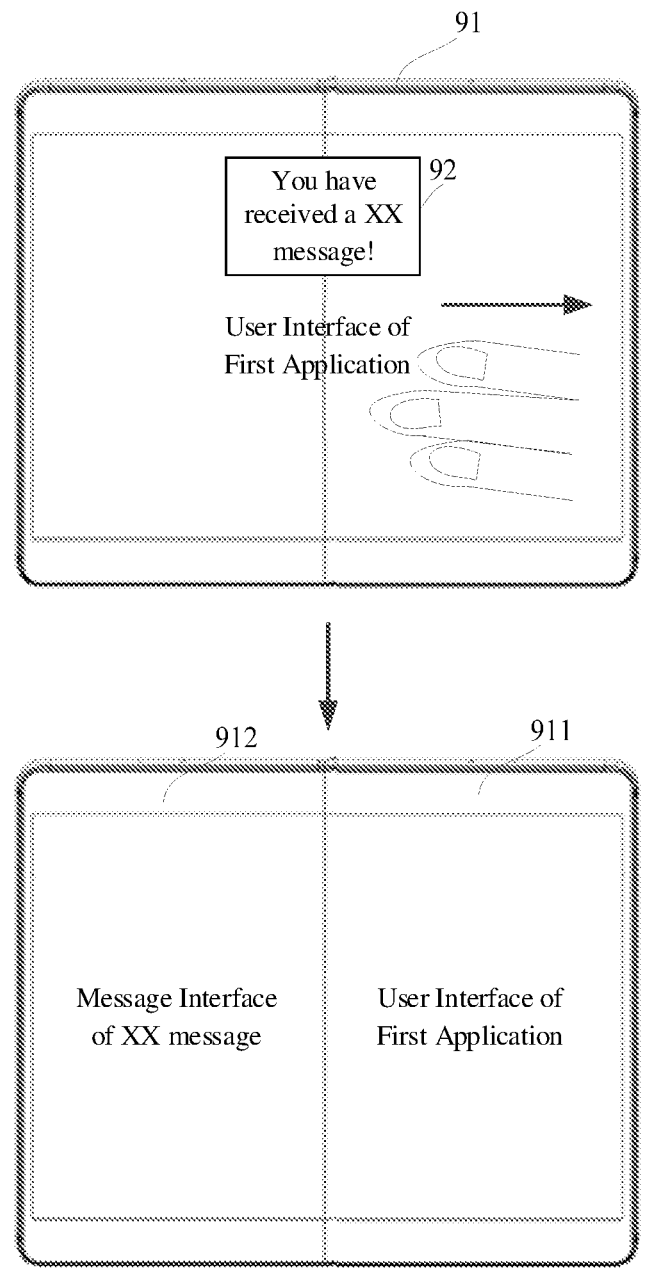
FIG. 9 is a schematic view of a user interface according to further another embodiment of the present disclosure.

Referring to FIG. 9, FIG. 9 is a schematic view of a user interface according to further another embodiment of the present disclosure. The terminal is configured to display a user interface of a first application on a foldable screen 91 in full screen. When a second application receives a message of a preset type, the terminal is configured to display a message pop-up window 92 of the message on an upper layer of the user interface of the first application. When a three-finger swipe signal is received, the user interface of the first application is displayed in a first display area 911, and the message interface of the message is displayed in a second display area 912.

In summary, in the user interface display method provided in the embodiments, the message interface of the message and the user interface of the first application are displayed on separate screens when receiving the message of the preset type, such that it is possible to realize a session with other users in parallel without affecting the user's use of the first application, improving the efficiency of the use of the terminal.

The following are apparatus embodiments of the present disclosure, which may be configured to implement the method embodiments of the present disclosure. For details not disclosed in the apparatus embodiments of the present disclosure, reference may be made to the method embodiments of the present disclosure.

Figure 10:
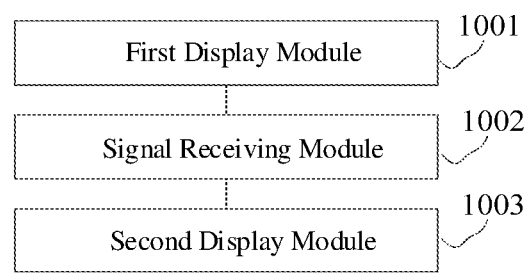
FIG. 10 is a block view of a user interface apparatus according to an embodiment of the present disclosure.

Referring to FIG. 10, FIG. 10 is a block view of a user interface apparatus according to an embodiment of the present disclosure. The apparatus has the function of realizing the above methods, and the function can be realized by hardware, or by hardware executing corresponding software. The apparatus may be applied to a terminal. The terminal includes a foldable screen. The foldable screen includes a first display area and a second display area. The apparatus includes components as followed.

A first display module 1001 is configured to display a user interface of a first application in full screen while the foldable screen is in a stretched state. The stretched state refers to a state where the first display area and the second display area are on a same plane.

A signal receiving module 1002 is configured to receive a first multi-finger swipe signal acted on the user interface of the first application displayed in full screen. The first multi-finger swipe signal refers to a signal generated in response to detecting at least two fingers slide on the foldable screen.

A second display module 1003 is configured to display the user interface of the first application in the first display area and display a user interface of a second application in the second display area in response to receiving the first multi-finger swipe signal.

In summary, in the technical solutions provided by the embodiments of the present disclosure, when the foldable screen displays a user interface of the application running in the foreground in full screen, the terminal may be configured to receive a multi-finger swipe signal, and display the user interface of the application running in the foreground in the first display area of the foldable screen and the user interface of another application in the second display area in response to receiving the multi-finger swipe signal, thereby enabling the user to view the user interface of other applications without closing the application running in the foreground. The user interface of the other applications may be viewed without closing the application running in the foreground, which improves the efficiency of using the terminal.

In some embodiments provided based on the embodiments shown in FIG. 10, the second display module 1003 is configured to perform operations as followed.

An application display interface in the second display area is displayed. The application display interface is configured to display at least one application including the second application.

A second operation signal acted on the second application is received.

The application display interface displayed in the second display area is switched to the user interface of the second application in response to receiving the second operation signal.

In some embodiments, the application display interface is configured to display an application matching the first application; the second display module 1003 is also configured to perform operations as followed.

An application with the same type of the first application is determined as the application matching the first application.

In some embodiments, the application display interface is configured to display an application matching the first application; the second display module 1003 is also configured to perform operations as followed.

An application that runs simultaneously with the first application and meets the first preset condition is determined as the application matching the first application.

In some embodiments provided based on the embodiments shown in FIG. 10, the apparatus further includes: a pop-up display module (not shown in the figure).

The pop-up window display module is configured to, in response to the second application receiving a message of a preset type, display a message pop-up window of the message on an upper layer of the user interface of the first application displayed in full screen.

The second application is an application corresponding to the message, and the pop-up window display module is also configured to cancel to display the message pop-up window displaying the message.

The second display module 1003 is configured to display the message interface of the message in the second display area.

In some embodiments provided based on the embodiments shown in FIG. 10, the signal receiving module 1002 is also configured to receive a second multi-finger swipe signal acted on the foldable screen.

The first display module 1001 is further configured to display a target user interface on the foldable screen in full screen in response to receiving the second multi-finger swipe signal. The target user interface may be the user interface of the first application or the user interface of the second application.

In some embodiments, the apparatus further includes: a position obtaining module and a first determination module (not shown in the figure). The position obtaining module is configured to obtain an initial touch position of the multi-finger swipe signal.

The first determining module is configured to determine the target user interface based on an area at which the initial touch position is located.

In some embodiments, the apparatus further includes: a direction obtaining module and a second determining module (not shown in the figure).

The direction obtaining module is configured to obtain a sliding direction of the second multi-finger swipe signal.

The second determining module is configured to determine a user interface corresponding to the sliding direction as the target user interface.

It should be noted that the apparatus provided by the above embodiments is only illustrated by the division of the above-mentioned functional modules in realizing its functions. In actual application, the above-mentioned functions can be assigned by different functional modules according to the needs, i.e., the internal structure of the apparatus is divided into different functional modules to accomplish all or part of the above-described functions. In addition, the apparatus provided by the above embodiments belongs to the same idea as the method embodiments, and its specific implementation process is detailed in the method embodiments, which will not be repeated here.

An example embodiment of the present disclosure further provides a computer-readable storage medium on which a computer program is stored. The computer program is loaded and executed by a processor to implement the user interface display method provided by the foregoing method embodiments.

An example embodiment of the present disclosure also provides a computer program product containing instructions. The computer program product runs on a computer to cause the computer to execute the user interface display method described in each of the foregoing embodiments.

It should be understood that the "plurality" mentioned herein refers to two or more. "And/or" describes the association relationship of the associated object, indicating that there can be three types of relationships, for example, A and/or B, which can mean: A alone exists, A and B exist at the same time, and B exists alone. The character "/" generally indicates that the associated objects are in an "or" relationship.

The serial numbers of the foregoing embodiments of the present disclosure are only for description, and do not represent the superiority of the embodiments.

The above are only example embodiments of the present disclosure and are not intended to limit the present disclosure. Any modification, equivalent replacement, improvement, etc. made within the spirit and principle of the present disclosure shall be within the scope of the present disclosure.

What is claimed is:

1. A user interface display method for a terminal, the terminal comprising a foldable screen comprising a first display area and a second display area, and the method comprising:
    displaying a user interface of a first application in full screen while the foldable screen being in a stretched state; wherein the stretched state is a state where the first display area and the second display area are on a same plane;
    receiving a first multi-finger swipe signal acted on the user interface of the first application displayed in full screen; wherein the first multi-finger swipe signal is generated in response to detecting at least two fingers sliding on the foldable screen; and
    in response to receiving the first multi-finger swipe signal, shrinking the user interface of the first application to obtain a processed user interface, the processed user interface matching the first display area; displaying the processed user interface of the first application in the first display area; and displaying a user interface of a second application in the second display area,
    wherein displaying the user interface of the second application in the second display area comprises:
    displaying an application display interface in the second display area; wherein the application display interface is configured to display at least one application comprising the second application;
    adjusting a size of the second display area according to a number of the at least one application;
    receiving an operation signal acted on the second application; and
    switching the application display interface displayed in the second display area to the user interface of the second application in response to receiving the operation signal.

2. The method according to claim 1, wherein displaying the user interface of the second application in the second display area comprises:
    displaying an application display interface in the second display area; wherein the application display interface is configured to display at least one application comprising the second application;
    receiving an operation signal acted on the second application; and
    switching the application display interface displayed in the second display area to the user interface of the second application in response to receiving the operation signal.

3. The method according to claim 2, wherein the application display interface is configured to display an application matching the first application;
    before displaying the user interface of the second application in the second display area, the method further comprises:
    determining an application with the same type of the first application as the application matching the first application.

4. The method according to claim 3, wherein a correspondence between application and types is pre-stored; and wherein determining the application with the same type of the first application as the application matching the first application comprises:
    determining a type of the first application by searching the correspondence, and;
    determining an application of which a type is same as the type of the first application as the application matching the first application.

5. The method according to claim 2, wherein the application display interface is configured to display an application matching the first application;
    before displaying the user interface of the second application in the second display area, the method further comprises:
    determining an application that runs simultaneously with the first application and meets a first condition as the application matching the first application.

6. The method according to claim 5, wherein determining the application that runs simultaneously with the first application and meets the first condition as the application matching the first application comprises:
    counting applications running simultaneously with the first application while the first application is running;
    counting a frequency of each of the applications running simultaneously with the first application every preset time; and
    filtering out the application with the frequency meeting the first condition.

7. The method according to claim 6, wherein the first condition is that the frequency of the application running simultaneously with the first application is greater than a first threshold, or the frequency of the application running simultaneously with the first application is ranked in top N places.

8. The method according to claim 1, wherein before receiving the first multi-finger swipe signal acted on the user interface of the first application displayed in full screen, the method further comprises:
    in response to the second application receiving a message of a preset type, displaying a message pop-up window of the message on an upper layer of the user interface of the first application displayed in full screen;

wherein the second application corresponds to the message; the displaying the user interface of the second application in the second display area comprises:
canceling to display the message pop-up window, and displaying a message interface of the message in the second display area.

9. The method according to claim 1, wherein after displaying the processed user interface of the first application in the first display area and displaying the user interface of the second application in the second display area, the method further comprises:
receiving a second multi-finger swipe signal acted on the foldable screen; wherein the second multi-finger swipe signal is generated in response to detecting at least two fingers slide on the foldable screen; and
displaying a target user interface on the foldable screen in full screen in response to receiving the second multi-finger swipe signal; wherein the target user interface is the user interface of the first application or the user interface of the second application.

10. The method according to claim 9, wherein before displaying the target user interface on the foldable screen in full screen in response to receiving the second multi-finger swipe signal, the method further comprises:
obtaining an initial touch position of the second multi-finger swipe signal; and
determining the target user interface based on an area at which the initial touch position is located.

11. The method according to claim 9, wherein before displaying the target user interface on the foldable screen in full screen in response to receiving the second multi-finger swipe signal, the method further comprises:
obtaining a sliding direction of the second multi-finger swipe signal; and
determining a user interface corresponding to the sliding direction as the target user interface.

12. The method according to claim 1, wherein the size of the processed user interface of the first application displayed in the first display area matches the size of the first display area, the size of the processed user interface of the first application displayed in the first display area being equal to or less than the size of the first display area, and a difference between the size of the processed user interface of the first application displayed in the first display area and the size of the first display area being less than a second threshold.

13. A terminal, comprising:
a processor;
a storage storing a computer program; and
a foldable screen comprising a first display area and a second display area; wherein the computer program is loaded and executed by the processor to perform:
displaying a user interface of a first application in full screen while the foldable screen is in a stretched state; wherein the stretched state is a state where the first display area and the second display area are on a same plane;
receiving a first multi-finger swipe signal acted on the user interface of the first application displayed in full screen; wherein the first multi-finger swipe signal is generated in response to detecting at least two fingers sliding on the foldable screen; and
in response to receiving the first multi-finger swipe signal, displaying the user interface of the first application in the first display area and displaying a user interface of a second application in the second display area,
wherein displaying the user interface of the second application in the second display area comprises:
displaying an application display interface in the second display area; wherein the application display interface is configured to display at least one application comprising the second application;
adjusting a size of the second display area according to a number of the at least one application;
receiving an operation signal acted on the second application; and
switching the application display interface displayed in the second display area to the user interface of the second application in response to receiving the operation signal.

14. The terminal according to claim 13, wherein the application display interface is configured to display an application matching the first application; and
wherein before displaying the user interface of the second application in the second display area, the computer program is loaded and executed by the processor to further perform:
determining an application with the same type of the first application as the application matching the first application.

15. The terminal according to claim 13, wherein the application display interface is configured to display an application matching the first application; and
wherein before displaying the user interface of the second application in the second display area, the computer program is loaded and executed by the processor to further perform:
determining an application that runs simultaneously with the first application and meets a first condition as the application matching the first application.

16. A non-transitory computer-readable storage medium for a terminal, storing a computer program; wherein the terminal comprises a foldable screen comprising a first display area and a second display area; and wherein the computer program is loaded and executed by a processor to perform:
displaying a user interface of a first application in full screen while the foldable screen is in a stretched state; wherein the stretched state is a state where the first display area and the second display area are on a same plane;
receiving a first multi-finger swipe signal acted on the user interface of the first application displayed in full screen; wherein the first multi-finger swipe signal is generated in response to detecting at least two fingers sliding on the foldable screen; and
in response to receiving the first multi-finger swipe signal, shrinking the user interface of the first application to obtain a processed user interface, the processed user interface matching the first display area; displaying the processed user interface of the first application in the first display area; and displaying a user interface of a second application in the second display area,
wherein displaying the user interface of the second application in the second display area comprises:
displaying an application display interface in the second display area; wherein the application display interface is configured to display at least one application comprising the second application;
adjusting a size of the second display area according to a number of the at least one application;
receiving an operation signal acted on the second application; and switching the application display interface displayed in the second display area to the user interface of the second application in response to receiving the operation signal.

17. The non-transitory computer-readable storage medium according to claim 16, wherein before receiving the first multi-finger swipe signal acted on the user interface of the first application displayed in full screen, the computer program is loaded and executed by the processor to further perform:

in response to the second application receiving a message of a preset type, displaying a message pop-up window of the message on an upper layer of the user interface of the first application displayed in full screen;

wherein the second application corresponds to the message; and wherein displaying the user interface of the second application in the second display area comprises:

canceling to display the message pop-up window, and displaying a message interface of the message in the second display area.

18. The non-transitory computer-readable storage medium according to claim 16, wherein after displaying the user interface of the first application in the first display area and displaying the user interface of the second application in the second display area, the computer program is loaded and executed by the processor to further perform:

receiving a second multi-finger swipe signal acted on the foldable screen; wherein the second multi-finger swipe signal is generated in response to detecting at least two fingers sliding on the foldable screen; and displaying a target user interface on the foldable screen in full screen in response to detecting the second multi-finger swipe signal; wherein the target user interface is the user interface of the first application or the user interface of the second application.

* * * * *